(12) United States Patent
Kim et al.

(10) Patent No.: US 12,344,314 B2
(45) Date of Patent: Jul. 1, 2025

(54) BODY FOR VEHICLE

(71) Applicants: Hyundai Motor Company, Seoul (KR); Kia Corporation, Seoul (KR)

(72) Inventors: Do Hoi Kim, Sejong-si (KR); Yong Ha Han, Yongin-si (KR); Ju Chul Kim, Ulsan (KR); Tae Gyu Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 357 days.

(21) Appl. No.: 17/946,285

(22) Filed: Sep. 16, 2022

(65) Prior Publication Data
US 2023/0147372 A1    May 11, 2023

(30) Foreign Application Priority Data
Nov. 11, 2021 (KR) .................. 10-2021-0154688

(51) Int. Cl.
| | | |
|---|---|---|
| B62D 25/06 | (2006.01) | |
| B60R 13/04 | (2006.01) | |
| B62D 25/02 | (2006.01) | |
| B62D 25/04 | (2006.01) | |
| B62D 25/08 | (2006.01) | |
| B62D 27/02 | (2006.01) | |

(52) U.S. Cl.
CPC .............. *B62D 25/06* (2013.01); *B60R 13/04* (2013.01); *B62D 25/02* (2013.01); *B62D 25/04* (2013.01); *B62D 25/08* (2013.01); *B62D 27/02* (2013.01); *B62D 27/023* (2013.01)

(58) Field of Classification Search
CPC ........ B62D 25/04; B62D 25/02; B62D 25/06; B62D 25/08; B62D 27/02; B62D 27/023; B60R 13/04
USPC ..................... 296/203.01–4, 210, 29, 30, 205
See application file for complete search history.

(56) References Cited

U.S. PATENT DOCUMENTS

| | | | | |
|---|---|---|---|---|
| 7,758,109 B2 * | 7/2010 | Reed | ...................... | B62D 25/06 |
| | | | | 296/210 |
| 8,465,089 B2 * | 6/2013 | Atkinson | ................ | B60R 13/04 |
| | | | | 296/209 |
| 9,365,166 B2 * | 6/2016 | Bartlett | ............ | B29C 45/14811 |
| 11,661,111 B2 * | 5/2023 | Kuipers | ............... | B62D 21/157 |
| | | | | 296/209 |

(Continued)

FOREIGN PATENT DOCUMENTS

| | | | | |
|---|---|---|---|---|
| CN | 105691463 A | * | 6/2016 | ............. B21D 19/04 |
| JP | 2016-078731 A | | 5/2016 | |
| JP | 2017-007571 A | | 1/2017 | |

(Continued)

OTHER PUBLICATIONS

CN105691463 Text (Year: 2016).*

*Primary Examiner* — Dennis H Pedder
(74) *Attorney, Agent, or Firm* — Morgan, Lewis & Bockius LLP

(57) ABSTRACT

A body for a vehicle includes a base part extending in a longitudinal direction of the vehicle and including a flange portion being open outward of the vehicle, a tubular part accommodated on and coupled to the flange portion of the base part and shaped in a pipe with a closed section, and an external garnish coupled to the base part or the tubular part to cover an external portion of the tubular part.

19 Claims, 12 Drawing Sheets

(56) References Cited

U.S. PATENT DOCUMENTS

2018/0257718 A1   9/2018   Kagami et al.

FOREIGN PATENT DOCUMENTS

| JP | 2017-192951 A | 10/2017 |
| KR | 10-2015-0104269 A | 9/2015 |
| KR | 10-2017-0135220 A | 12/2017 |
| KR | 10-2019-0107527 A | 9/2019 |

* cited by examiner

BODY FOR VEHICLE

CROSS REFERENCE TO RELATED APPLICATION

The present application claims priority to Korean Patent Application No. 10-2021-0154688, filed Nov. 11, 2021, the entire contents of which is incorporated herein for all purposes by this reference.

BACKGROUND OF THE PRESENT DISCLOSURE

Field of the Present Disclosure

The present disclosure relates to a body for a vehicle. More particularly, the present disclosure relates to a technique of applying a body for a vehicle to various types of vehicles sharing a lower body including a front portion, a rear portion, and a lower portion of the body for a vehicle so that the front portion, the rear portion, and the lower portion of the body for a vehicle are integrally manufactured and an upper body is then manufactured to be coupled to the lower body.

Description of Related Art

In a conventional steel Body In White (BIW) upper body frame, openings of a roof, a side portion, a windshield, and a lid portion have individual sections, and the opening member is partially formed at an open section. In other words, the conventional vehicle body has a structure in which an A pillar and an end portion of a roof side member are disconnected and the disconnected end portion thereof is connected to another member.

It is difficult to secure body rigidity, ceiling rigidity, and durability performance because of the opening and the open section of the upper body component, and in forming a closed section structure, an increase in the number of components for assembly and connection of the vehicle body, and an assembly problem occur.

Therefore, in the conventional disconnected structure of connecting members to each other, there is a problem in that it is difficult to secure the strength to maintain occupant space as much as possible in an event of collision or rollover.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a body for a vehicle, the body for a vehicle being configured so that a front portion, a rear portion and a lower portion of the body for a vehicle are integrally manufactured and a separate portion from an A pillar toward a side surface of a roof is manufactured and coupled thereto to be applied to various types of vehicles sharing the front portion, the rear portion of the base frame, and the lower portion.

In various aspects of the present disclosure, there is provided a body for a vehicle, the body including: a base part extending in a longitudinal direction of the vehicle and including a flange portion being open outward of the vehicle; a tubular part accommodated on and coupled to the flange portion of the base part and shaped in a pipe with a closed section; and an external garnish coupled to the base part or the tubular part to cover an external portion of the tubular part.

The body for a vehicle may include: a base frame made of a metal material and including a front portion, a rear portion, and a lower portion of the vehicle body, the lower portion connecting the front portion to the rear portion of the base frame, wherein a front end portion of the base part, the tubular part, or the external garnish may be connected to the front portion and a rear end portion thereof is connected to the rear portion of the base frame.

The body for a vehicle may include: an internal bracket coupled to internal portions of the base part and the tubular part to connect the base part and the tubular part to the front portion; and an external bracket coupled to external portions of the base part and the tubular part to connect the base part and the tubular part to the front portion.

The internal bracket may be coupled to an external portion of an internal plate of the front portion, and the external bracket may be coupled to an external portion of an external plate of the front portion.

The internal bracket may be coupled to an internal portion of an internal plate of the front portion and the external bracket may be coupled to an external portion of an external plate of the front portion.

The rear portion of the base frame may include a C pillar extending toward a roof of the vehicle and the lower portion may include a B pillar extending toward the roof, and rear end portions of the base part and the tubular part may be connected to the C pillar, and middle portions of the base part and the tubular part may be connected to the B pillar.

The body for a vehicle may include a B pillar bracket connected to the tubular part to connect the tubular part to an external plate of the B pillar, wherein the base part may be connected to an internal plate of the B pillar.

The base part may be connected to an external portion of the internal plate of the B pillar and the B pillar bracket may be connected to an external portion of the external plate of the B pillar.

The base part may be connected to an external plate of the C pillar and the external garnish may be connected to a lower end portion of the external plate of the C pillar.

The flange portion may be formed in an open flange while including an upper flange connected to an upper portion of the base part and extending outward and a lower flange connected to a lower portion of the base part and extending outward, and the tubular part may be accommodated between the upper flange and the lower flange and is coupled to the base part.

The base part, the flange portion, and the tubular part may be made of a metal material, and be joined to each other by welding.

The base part, the flange portion, and the tubular part which may be made of the metal material may be coupled to the plastic external garnish by mechanical coupling.

Pair of base parts, tubular parts, and external garnishes may be provided at transversally opposite portions of the vehicle, and the body for a vehicle may further include: a roof member connected from each of the base parts to a roof of the vehicle.

The body for a vehicle may include a roof bracket connecting the base part to the roof member.

Opposite end portions of the base part may integrally connect an A pillar to a side portion of a roof of the vehicle.

The external garnish may form an exterior of the vehicle, and be made of a plastic material.

According to an exemplary embodiment of the present disclosure, the front portion, the rear portion of the base frame, and the lower portion of the body for a vehicle are integrally manufactured, and a portion from the pillar to the roof side surface is coupled to the front portion, the rear portion of the base frame, and the lower portion while the tubular part with an closed section is inserted into and coupled to the open flange provided in the base part. Therefore, the portion from the pillar to the roof side surface is not disconnected and is formed in a continuously extended shape, so that the rigidity of the upper body of the vehicle may be improved In manufacturing the open flange, the shape of the open flange is formed so that the base part is manufactured by a press process and the flange portion is manufactured as a separate object and coupled to the base part, so that the manufacturing cost may be reduced.

Furthermore, as the base part and the tubular part are manufactured in various shapes, the front portion, the rear portion of the base frame, and the lower portion may be shared in various types of vehicles and the upper body of a vehicle may be variously applied to vehicles with different shapes, so that the manufacturing cost may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
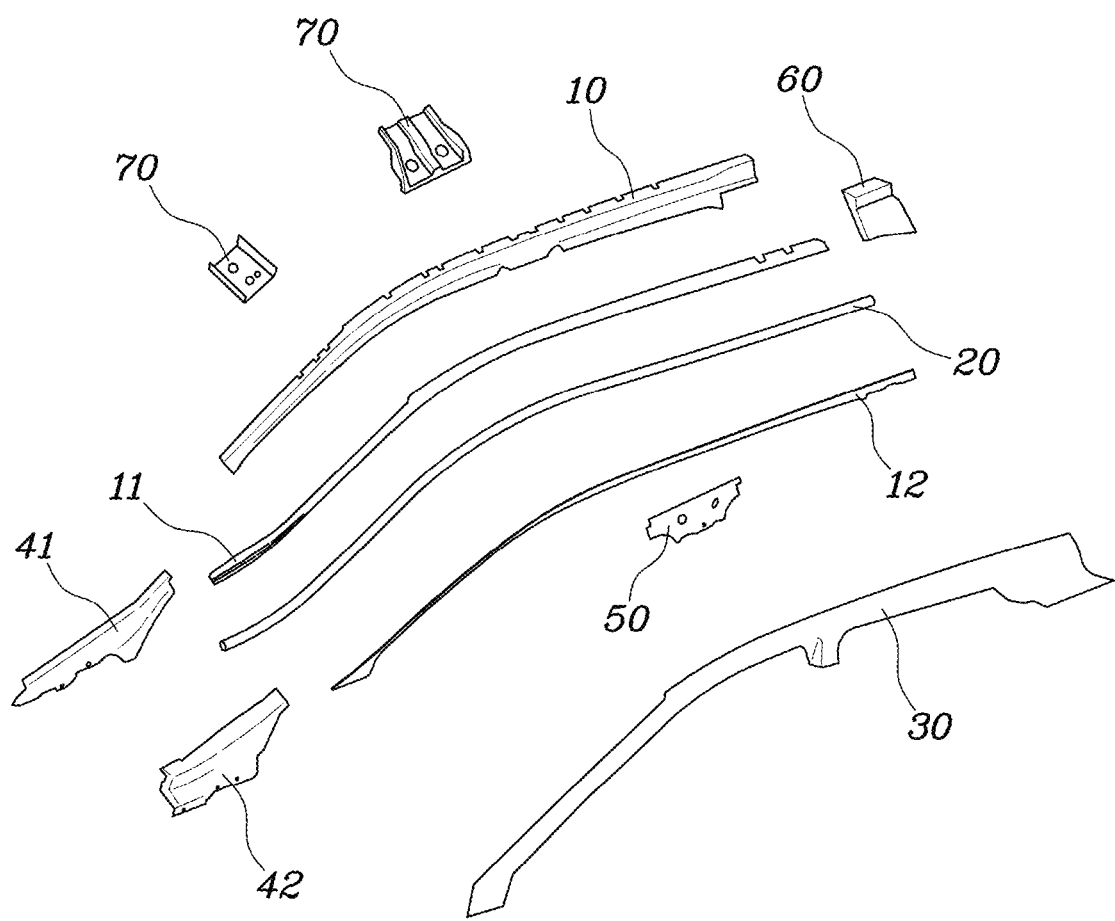
FIG. 1 is an exploded-perspective view showing a base part, a tubular part, and an external garnish of a body for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to an exemplary embodiment according to the concept of the present disclosure is directed to describe the exemplary embodiment of the present disclosure, so it should be understood that the present disclosure may be variously embodied, without being limited to the exemplary embodiment of the present disclosure.

An exemplary embodiment described herein may be changed in various ways and various shapes, so a specific embodiment is shown in the drawings and will be described in detail in the exemplary embodiment of the present disclosure. However, it should be understood that the exemplary embodiment according to the concept of the present disclosure is not limited to the exemplary embodiment which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

The terminology used herein is for describing a particular embodiment only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Hereinbelow, an exemplary embodiment will be described in detail with reference to the accompanying drawings. Like reference numerals provided in the drawings indicate like components.

Figure 2:
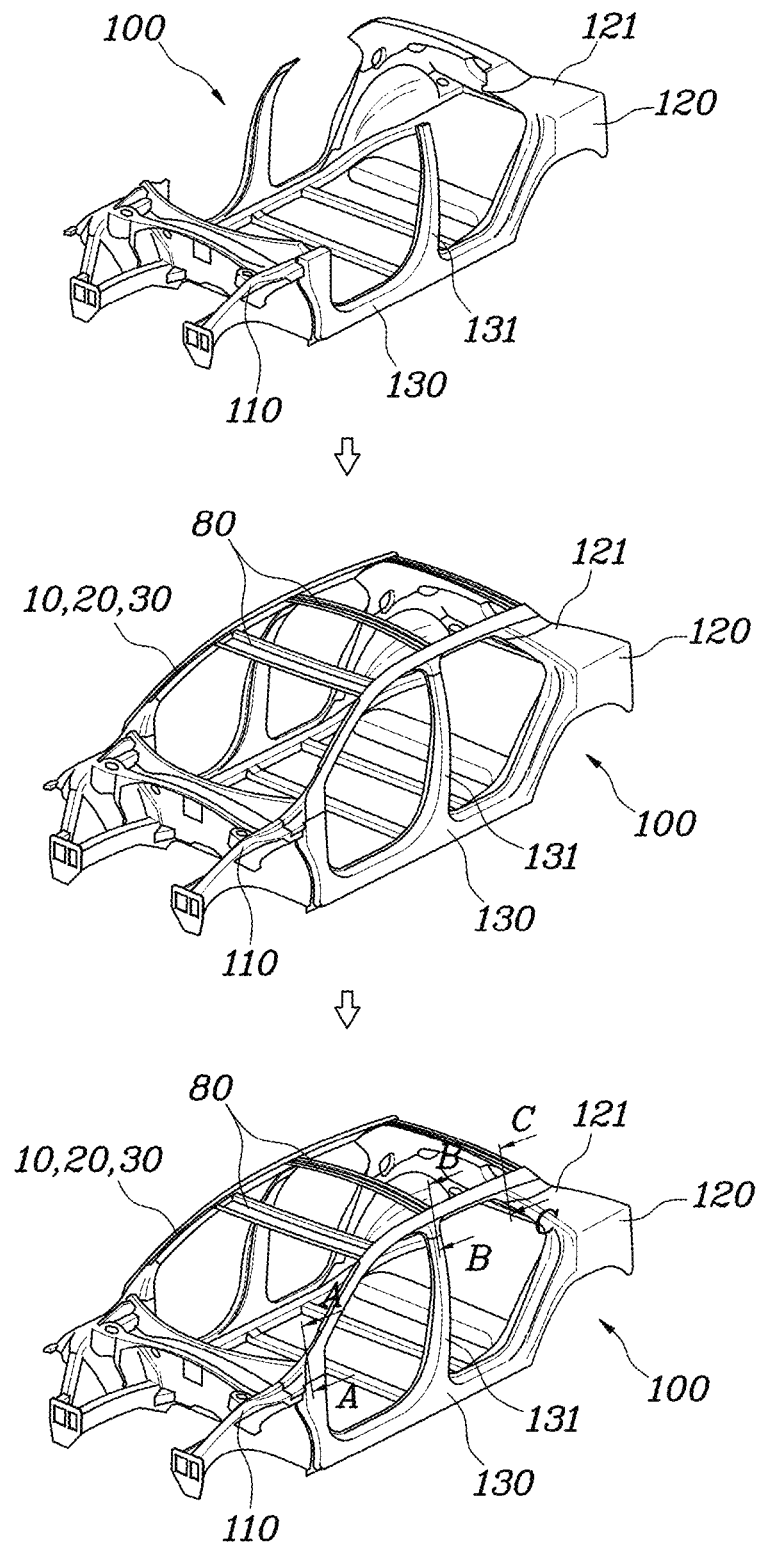
FIG. 2, FIG. 3 and FIG. 4 are perspective views showing a coupling embodiment of the body for a vehicle according to the exemplary embodiment of the present disclosure.
Figure 3:
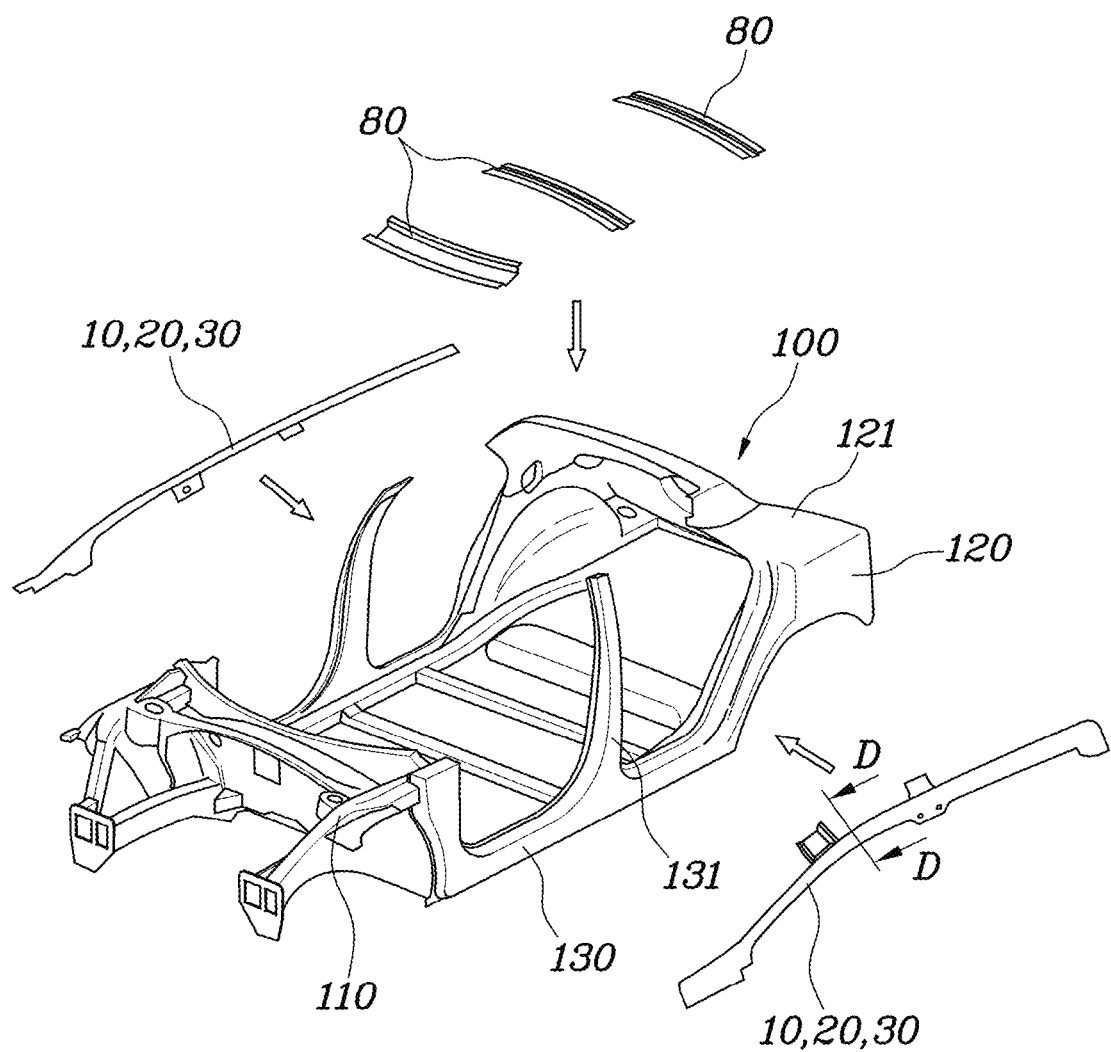
Figure 4:
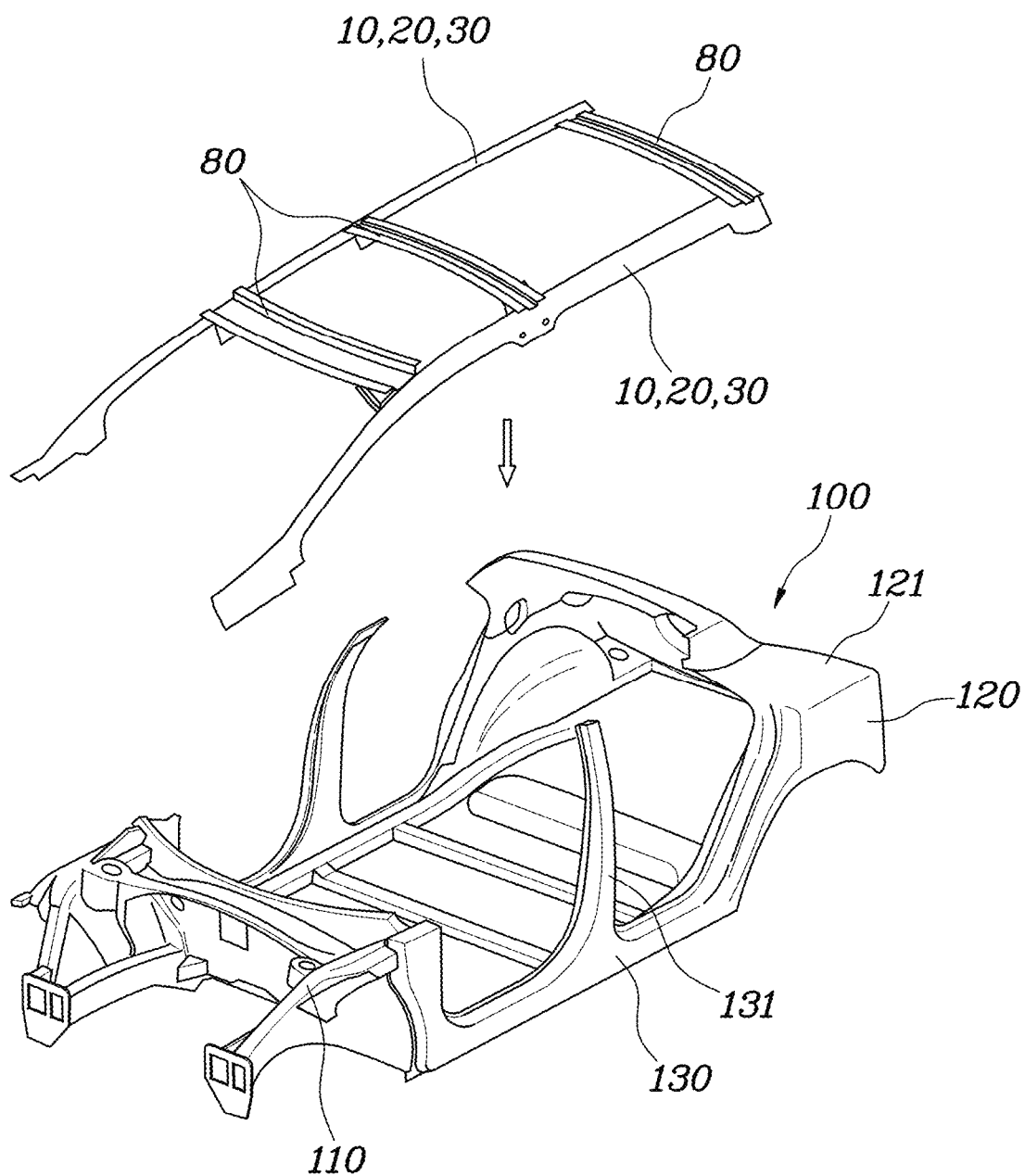
Figure 5A:
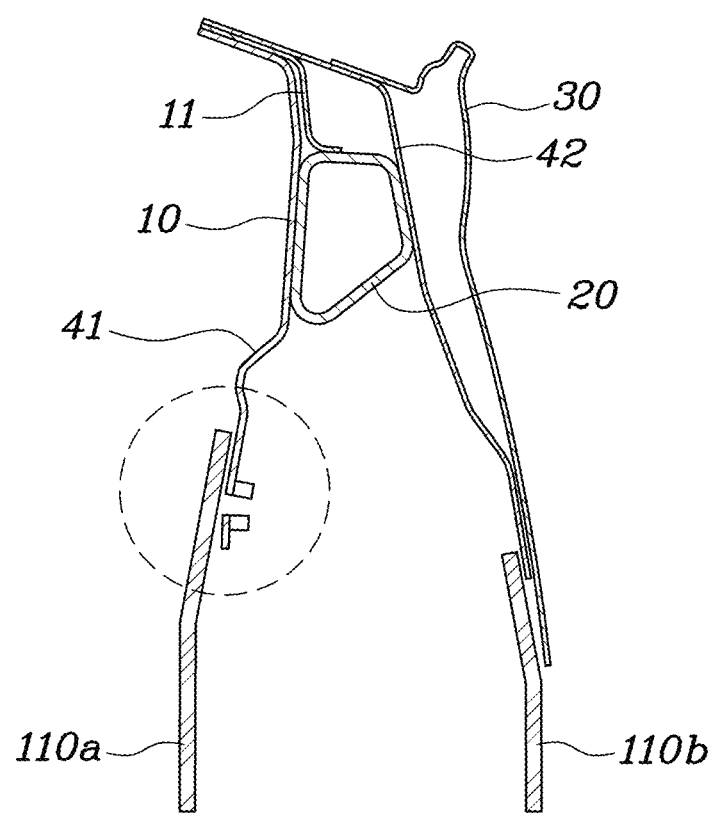
FIG. 5A and FIG. 5B are sectional views showing two example taken along line A-A in FIG. 2.
Figure 5B:
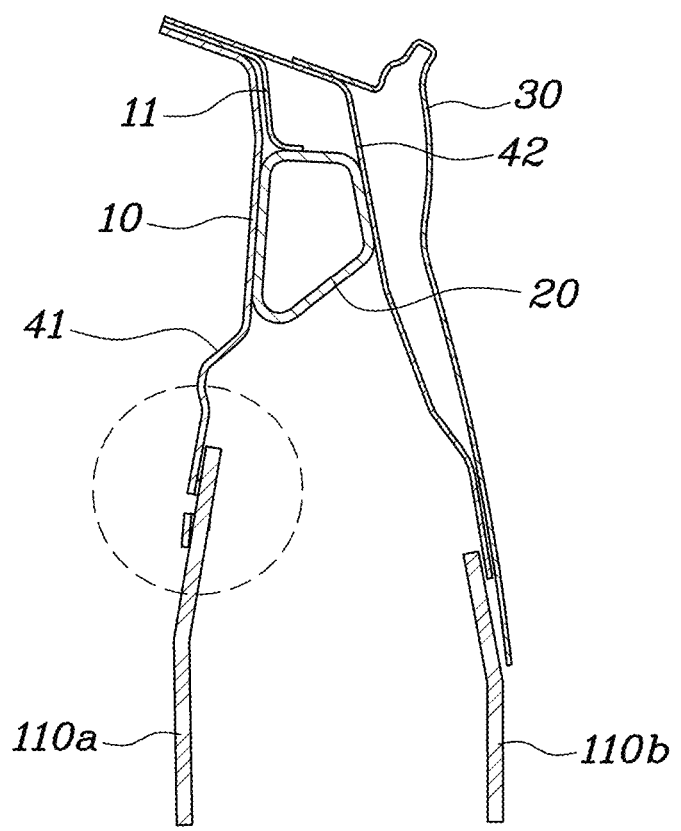
Figure 6:
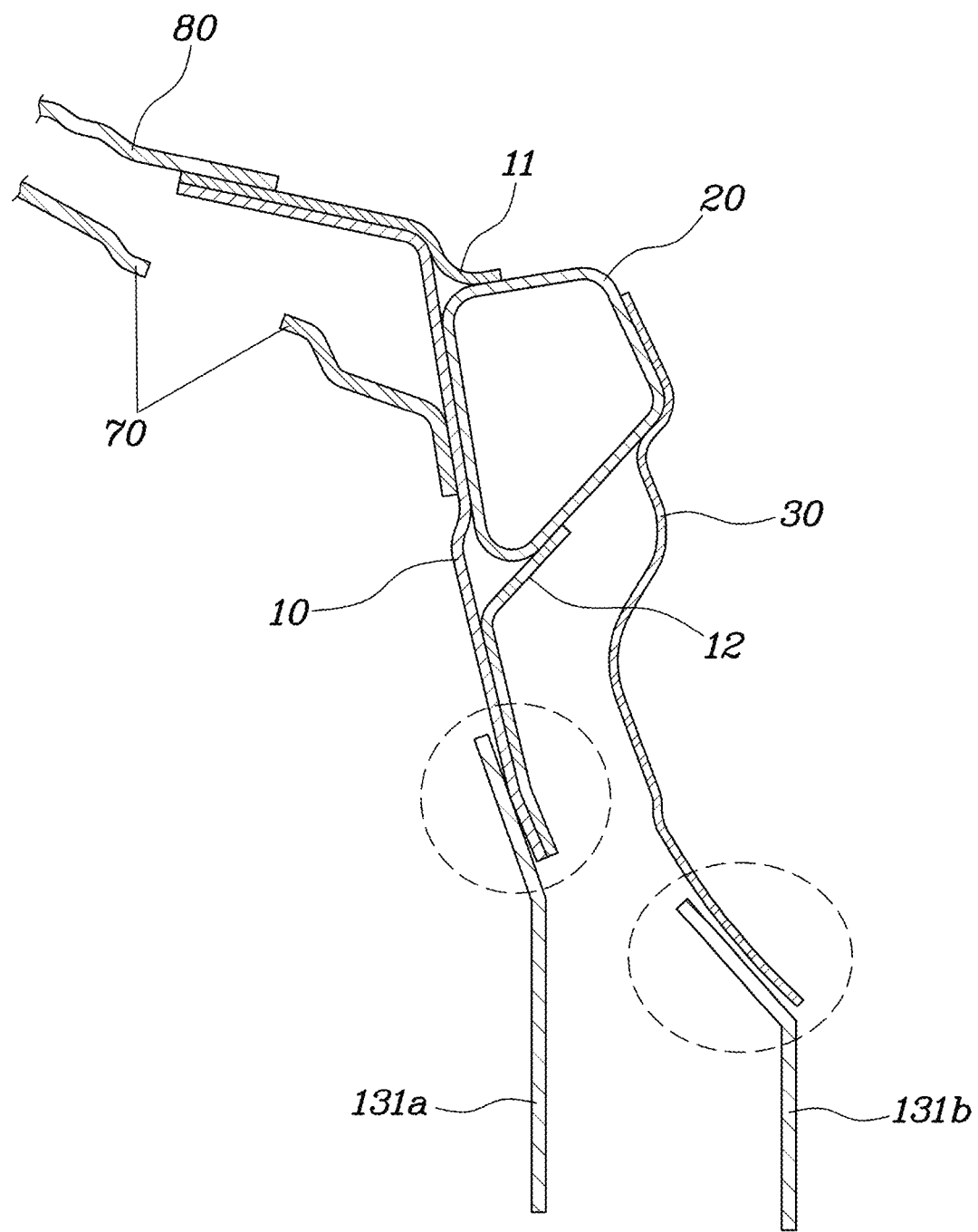
FIG. 6 is a sectional view taken along line B-B in FIG. 2.
Figure 7:
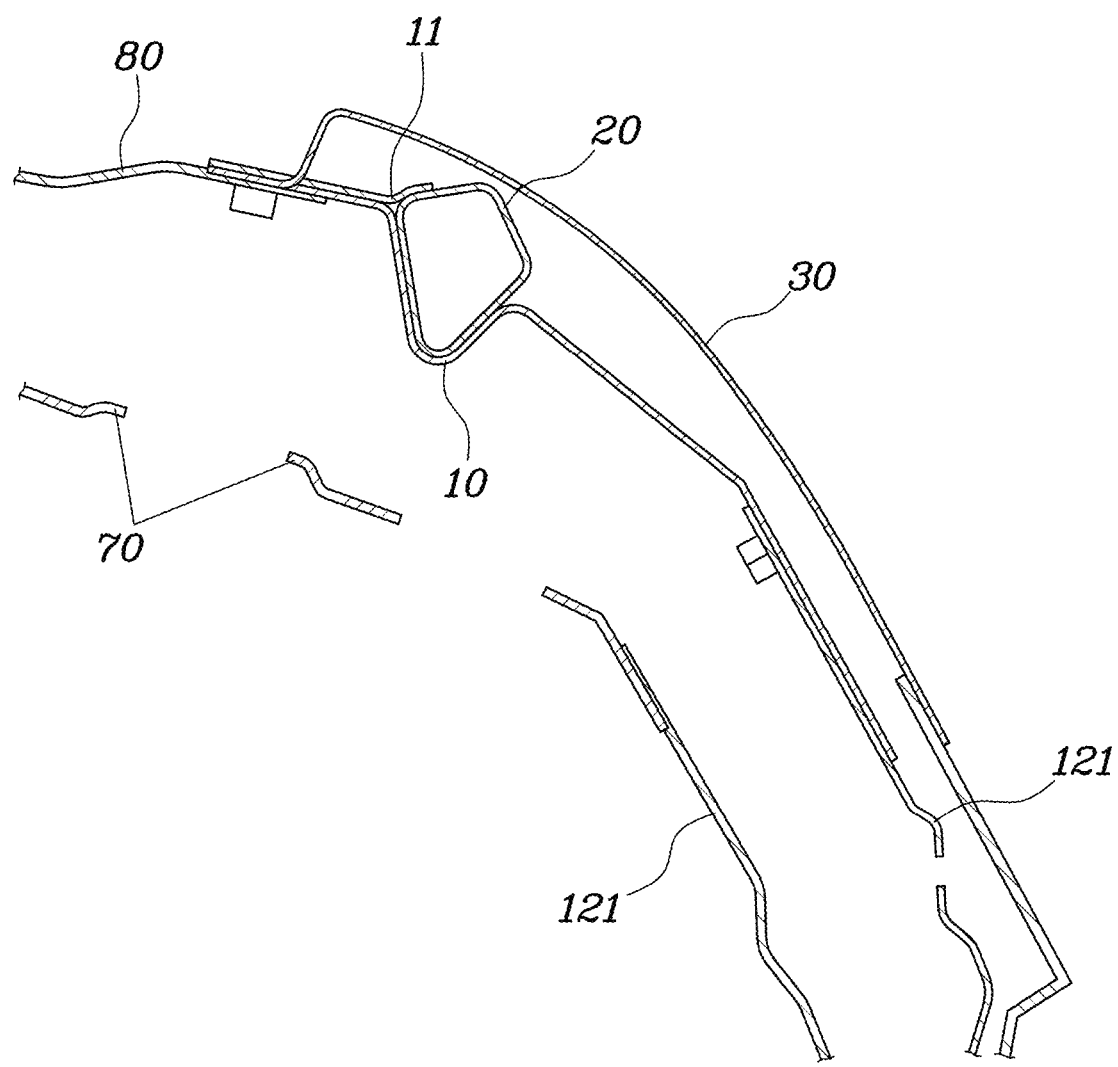
FIG. 7 is a sectional view taken along line C-C in FIG. 2.
Figure 8:
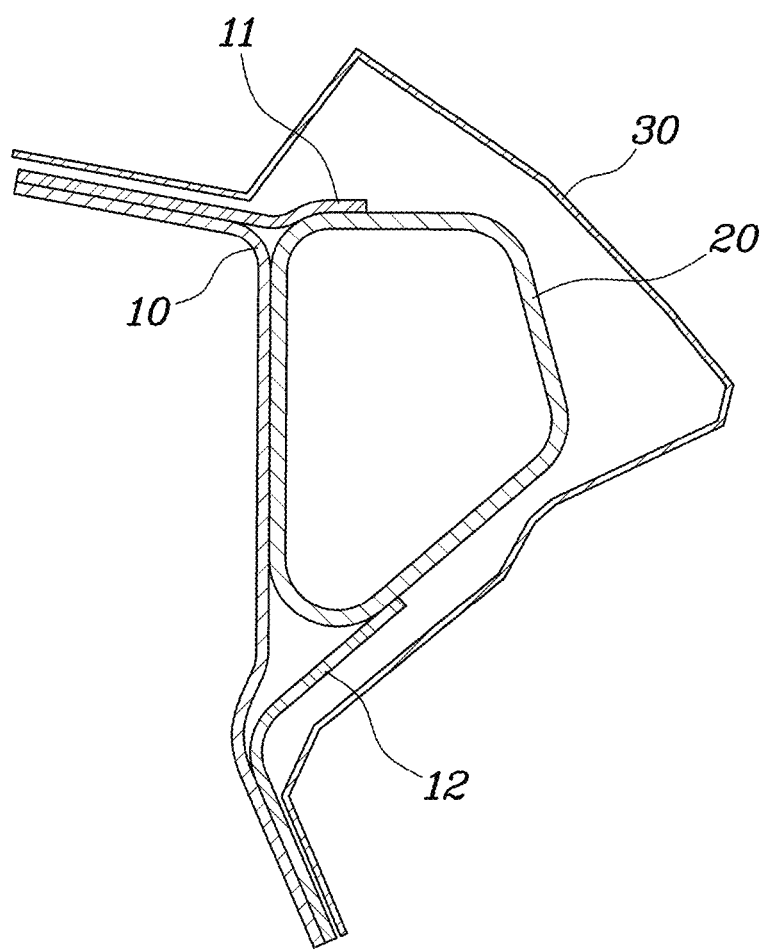
FIG. 8 is a sectional view taken along line D-D in FIG. 3.

FIG. 1 is an exploded-perspective view showing a base part 10, a tubular part 20, and an external garnish 30 of a body for a vehicle according to various exemplary embodiments of the present disclosure. FIG. 2, FIG. 3 and FIG. 4 are perspective views showing a coupling embodiment of the body for a vehicle according to the exemplary embodiment of the present disclosure. FIG. 5A and FIG. 5B are sectional views showing two example taken along line A-A in FIG. 2. FIG. 6 is a sectional view taken along line B-B in FIG. 2. FIG. 7 is a sectional view taken along line C-C in FIG. 2. FIG. 8 is a sectional view taken along line D-D in FIG. 3.

As shown in FIG. 1, FIG. 2, FIG. 3, FIG. 4, FIG. 5, FIG. 6, FIG. 7, and FIG. 8, the body for a vehicle according to the exemplary embodiment of the present disclosure will be described.

According to an exemplary embodiment of the present disclosure, the body for a vehicle includes: the base part 10 extending in a longitudinal direction of the vehicle and including a shape integrally connecting an A pillar to a side portion of a roof, and including a flange portion which is open outward of the vehicle; the tubular part 20 including a shape extending in the longitudinal direction along the base part 10, accommodated on and coupled to the flange portion of the base part 10, and shaped in a bent pipe with a closed section; and the external garnish 30 including a shape extending in the longitudinal direction along the base part 10, coupled to the base part 10 or the tubular part 20 to cover an external portion of the tubular part 20 to form the exterior of the vehicle, and made of a plastic material.

The base part 10 is shaped in an open flange which is open outward of the vehicle, and the tubular part 20 is accommodated on the open flange and is coupled to the base part 10.

The base part 10 may be manufactured from a metal material by press process, the tubular part 20 is shaped in a metal pipe by aluminum extrusion molding and may be molded by a post processing to be accommodated on the open flange of the base part 10.

The tubular part 20 shaped in a metal pipe is coupled to the base part 10 manufactured by press molding from a metal plate, so that insufficient rigidity of the base part 10 may be reinforced. The base part 10 is manufactured by press molding and the tubular part 20 is manufactured by extrusion molding and post processing, so that the manufacturing cost may be reduced.

Furthermore, the base part 10 and the tubular part 20 extending from the pillar and the roof of the vehicle may be easily changed in shapes, so there is an effect of improving convenience by which an exemplary embodiment of the present disclosure is deformed and applied to various types of vehicles sharing a lower frame or a lower platform.

Furthermore, while the tubular part 20 is coupled to the base part 10, the external garnish 30 which is an external plate is coupled to the base part 10 or the tubular part 20 to form the exterior of the vehicle, so rigidity of the base part 10 and the tubular part 20 may be improved.

The external garnish 30 is manufactured by press molding from a steel material or manufactured of a material such as plastic, a material thereof may be determined by the manufacturing cost of the vehicle.

The body for a vehicle includes: a base frame 100 made of the metal material and including a front portion 110, a rear portion 120, and a lower portion of the body connecting the front portion 110 to the rear portion 120. The base part 10, the tubular part 20, and the external garnish 30 may be connected at front end portions thereof to the front portion 110 and at rear end portions thereof to the rear portion 120.

As shown in FIG. 2, FIG. 3 and FIG. 4, as the lower portion coupled to an upper portion of the body for a vehicle, the base frame 100 in which the lower portion, the front portion 110, and the rear portion 120 of the vehicle are integrally manufactured may be formed. The base frame 100 may be formed in an integral body as the monocoque body shape, or the lower portion is manufactured first as the frame body and then both the front portion 110 and the rear portion 120 may be additionally coupled to the lower portion. The base part 10 and the external garnish 30 in which the tubular part 20 is inserted may be coupled in various shapes to an upper portion of the base frame 100.

Therefore, in manufacturing various vehicles sharing the lower portion and differing at each upper portion, there is a manufacturing cost reduction effect.

The body for a vehicle may include: an internal bracket 41 coupled to internal portions of the base part 10 and the tubular part 20 and connecting both the base part 10 and the tubular part 20 to the front portion 110; and an external bracket 42 coupled to external portions of the base part 10 and the tubular part 20 and connecting both the base part 10 and the tubular part 20 to the front portion 110.

As shown in FIG. 1, the front end portion of the base part 10 may be coupled to the front portion 110 of the base part 10. To improve rigidity and convenience of coupling between the front end portion of the base part 10 and the front portion 110, the internal bracket 41 may be coupled to an internal portion of the front end portion of the base part 10 and the external bracket may be coupled to an external portion of the front end portion of the base part 10.

Therefore, when the shape of the front portion 110 is changed, the base part 10 may be coupled to the front portion 110 as the internal bracket 41 and the external bracket 42 are deformed little, and the internal bracket 41 and the external bracket 42 may be deformed in response to a coupling direction of the base part 10.

Therefore, the manufacturing cost may be reduced when the present disclosure is applied to various vehicles, and convenience of coupling work may be improved.

Figure 9A:
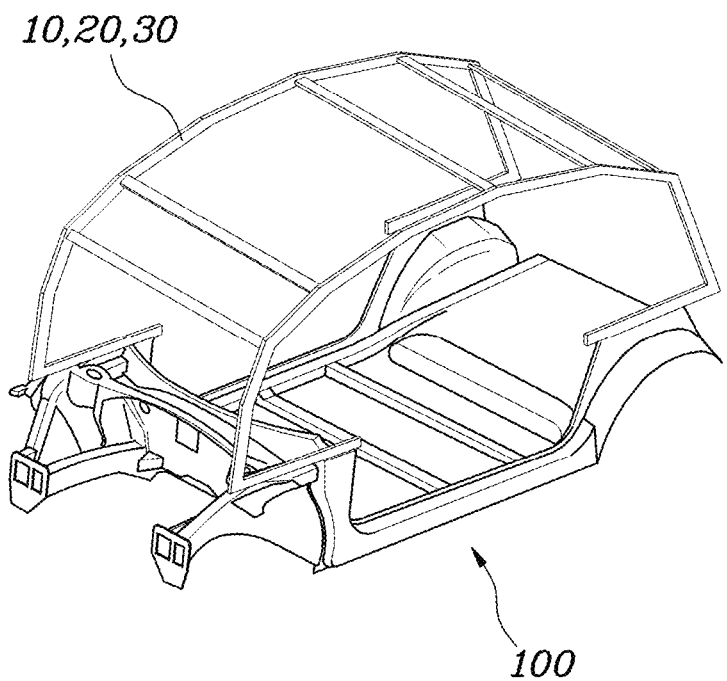
FIG. 9A, FIG. 9B, and FIG. 9C are views showing various examples of the body for a vehicle according to the exemplary embodiment of the present disclosure.
Figure 9A:
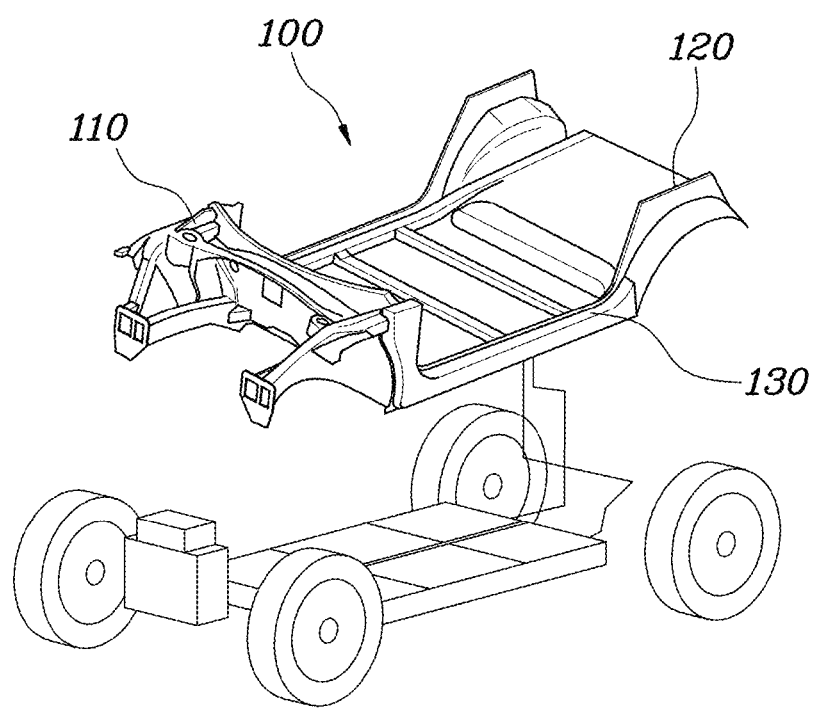
Figure 9B:
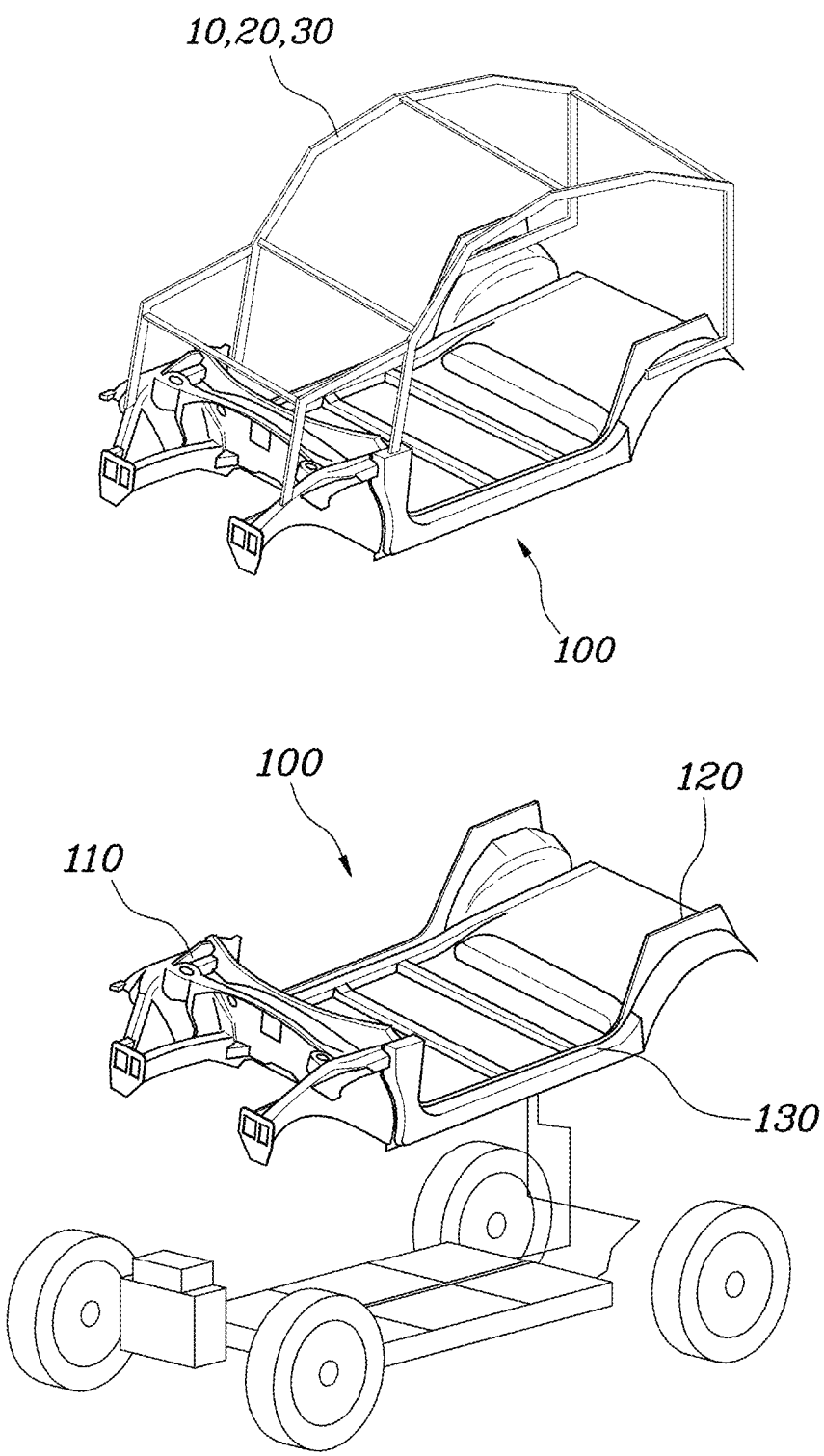
Figure 9C:
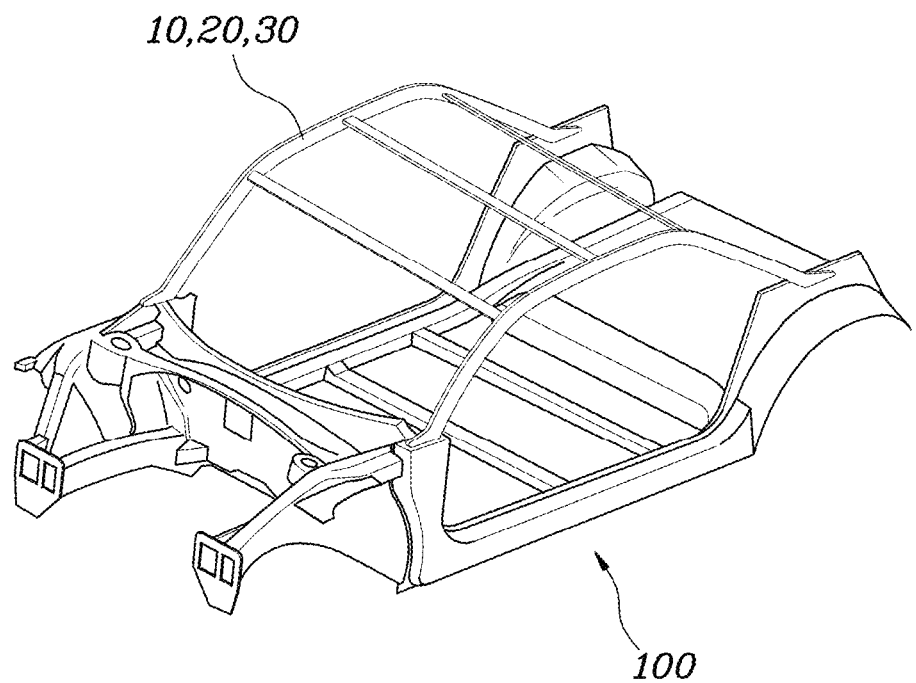
Figure 9C:
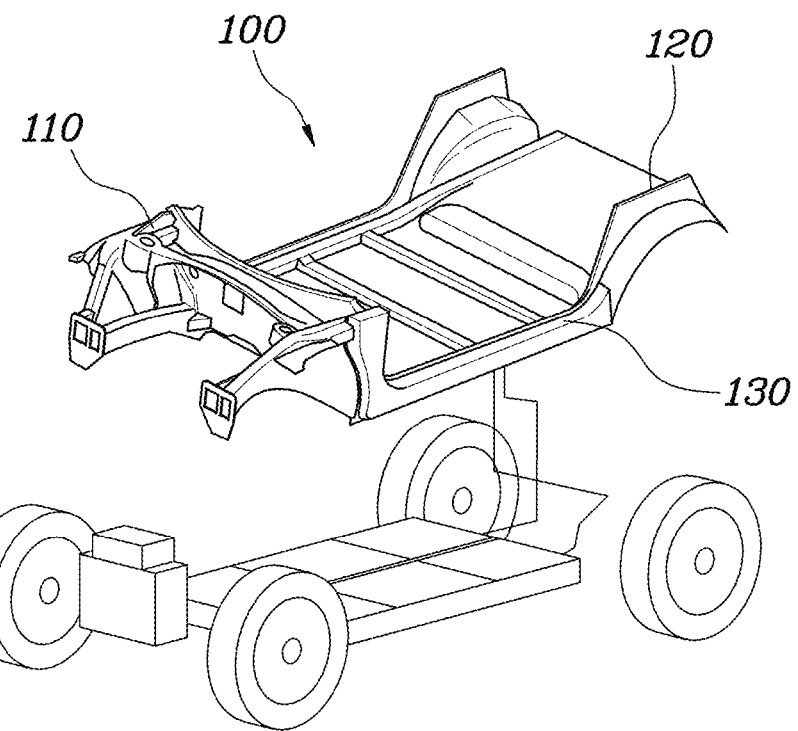

FIG. 9A, FIG. 9B, and FIG. 9C are views showing various examples of the body for a vehicle according to the exemplary embodiment of the present disclosure.

As shown in FIG. 9A, FIG. 9B, and FIG. 9C, the base frame 100 forms the lower portion of the vehicle, and according to an exemplary embodiment of the present disclosure, the base part 10 and the tubular part 20 may form a side surface of the pillar portion and the roof portion of the base frame 100.

As shown in FIG. 9A, FIG. 9B, and FIG. 9C, the base part 10 and the tubular part 20 that are shaped variously and coupled to the base frame may be formed in various types of vehicles in response to customer requirements even in the equivalent base frame 100.

The body for a vehicle according to an exemplary embodiment of the present disclosure may be applied to a purpose-built vehicle (PBV), and in the PBV, it is necessary to develop a vehicle suitable for the market of small-volume, multi-variety production.

The PBV is considered in terms of flexibility, freedom of design, reduction in the number of components, assembly in a smart factory, weight reduction, cost reduction, space utilization and performance in response to customer requirements. To meet the above considerations, the tubular part 20 is provided as a frame in the base frame 100 included in an exemplary embodiment of the present disclosure and the base part 10 formed by a press process is coupled to an external portion of the tubular part 20, so that the above-described considerations may be advantageous in a method of manufacturing various types of vehicle models in comparison to a conventional monocoque body method.

According to an exemplary embodiment of the present disclosure, the base part 10 may be coupled to both the front portion and the rear portion of the base frame 100, the front portion and the rear portion may have the shapes changed variously.

According to the exemplary embodiment of the present disclosure, a C pillar extending from the rear portion is formed and is connected to the base part, and the C pillar may be shaped variously.

The PBV may be applied to an electric vehicle platform, and a battery, a motor wheel, and a suspension, which are devices in the drive system, are provided in the lower portion, and the base frame 100 may be coupled to an upper portion of the drive system, forming the body for a vehicle.

The internal bracket 41 is coupled to an external portion of an internal plate 110*a* of the front portion 110, and the external bracket 42 may be coupled to an external portion of an external plate 110*b* of the front portion 110.

As shown in FIG. 2, to couple the base part 10 to the base frame 100 in a transverse direction of the vehicle, the internal bracket 41 may be coupled to the external portion of the internal plate 110*a* of the front portion of the base frame 100. Therefore, the internal bracket 41 is coupled first to the external portion of the internal plate 110*a* of the front portion 110, and the external bracket 42 may be coupled to the external portion of the external plate 110*b* of the front portion 110.

As shown in FIG. 5A, the length of the internal plate 110*a* of the front portion is preset longer than the length of the external plate 110*b*. Therefore, the internal bracket 41 and the external bracket 42 may be coupled to the base frame 100 in the transverse direction from the base frame 100 while being coupled to a base panel.

Accordingly, on the product line, the base part 10 may be conveniently coupled to the base frame 100 in the transverse direction thereof.

The internal bracket 41 is coupled to an internal portion of an internal plate 110*a* of the front portion 110, and the external bracket 42 may be coupled to an external portion of the external plate 110*b* of the front portion 110.

As shown in FIG. 3, to couple the base part 10 to the base frame 100 in a downward direction of the vehicle, the internal bracket 41 may be coupled to the internal portion of the internal plate 110*a* of the front portion of the base frame 100. Therefore, the internal bracket 41 is coupled first to the internal portion of the internal plate 110*a* of the front portion 110, and the external bracket 42 may be coupled to the external portion of the external plate 110*b* of the front portion 110.

As shown in FIG. 5A, the length of the internal plate 110*a* of the front portion is preset longer than the length of the external plate 110*b*. Therefore, the internal bracket 41 and the external bracket 42 may be coupled to the base frame 100 in the transverse direction of the base frame 100 while being coupled to a base panel.

Accordingly, on the product line, the base part 10 may be conveniently coupled to the base frame 100 in the transverse direction thereof.

The rear portion 120 of the base frame 100 has a C pillar 121 extending toward the roof, and the lower portion has a B pillar 131 extending toward the roof. The rear end portions of the base part 10 and the tubular part 20 may be connected to the C pillar 121 and middle portions of the base part 10 and the tubular part 20 may be connected to the B pillar 131.

As shown in FIG. 7, a rear end portion of the base part 10 may be connected to the C pillar 121 extending forward from the rear portion 120 of the base frame 100. The C pillar bracket 60 provided for connection of the C pillar 121 is connected to the base frame 100 and the C pillar bracket 60 may be connected to an external plate of the C pillar 121 to connect the base part 10 to the base frame 100.

For each type of vehicle, the shape of the C pillar 121 may be deformed or the shape of the base part 10 may be deformed, and then as the shape of the C pillar bracket 60 is deformed to connect the C pillar 121 to the base part 10 to improve the convenience of the manufacturing process.

The body for a vehicle includes a B pillar bracket 50 connected to the tubular part 20 to connect the tubular part 20 to a B pillar external plate 131*b*. The base part 10 may be connected to a B pillar internal plate 131*a*.

As shown in FIGS. 1 and 6, a middle portion of the base part 10 may be connected to the B pillar 131.

In response to a shape of a vehicle, the base part 10 and the tubular part 20 may have various shapes. To connect both the base part 10 and the tubular part 20 to the B pillar 131, a B pillar bracket 50 may be provided to be coupled to the tubular part 20.

Therefore, even when the B pillar 131 may be variously shaped or the shapes of the base part 10 and the tubular part 20 are variously shaped, the base part 10 and the tubular part 20 may be coupled to the B pillar bracket 50 and then easily coupled to the B pillar 131.

The base part 10 is connected to an external portion of the B pillar internal plate 131*a*, and the B pillar bracket 50 may be connected to an external portion of the B pillar external plate 131*b*.

As shown in FIG. 6, in coupling of the base part 10 and the tubular part 20 in the downward direction or transverse direction, the base part 10 may be coupled to the external portion of the B pillar internal plate 131*a* and the B pillar bracket 50 coupled to the tubular part 20 may be coupled to the external portion of the B pillar external plate 131*b*.

An end portion of the B pillar 131 is bent inwardly from the vehicle and the internal plate 131*a* of the B pillar is formed longer than the external plate 131*b* thereof, so that both the base part 10 and the tubular part 20 may be designed to be coupled to the B pillar bracket 50 in the downward direction or the transverse direction thereof.

With the above structure, the base part 10 and the tubular part 20 may be assembled in various methods on the product line so that the assembly convenience may be improved.

The base part 10 is coupled to the external plate of the C pillar 121 and the external garnish 30 may be connected to a lower end portion of the external plate of the C pillar 121.

As shown in FIG. 7, upper and lower end portions of the base part 10 are coupled to the external plate of the C pillar 121 at a coupled portion between the base part 10 and the C pillar 121. The external garnish 30 is coupled to both the external portion of the base part 10 and a lower end portion of the C pillar 121 to cover the base part 10 and the tubular part 20 and to form the exterior of the vehicle.

The base part 10 and the tubular part 20 may be coupled to the front portion 110, the B pillar 131, and the C pillar 121 by mechanical coupling methods such as metal welding, bolting, or riveting, so that coupling rigidity may be improved.

The flange portion is formed in an open flange while including an upper flange 11 connected to an upper portion of the base part 10 and extending outward and a lower flange 12 connected to a lower portion of the base part 10 and extending outward. The tubular part 20 may be accommodated between the upper flange 11 and the lower flange 12 and coupled to the base part 10.

As shown in FIGS. 1 and 8, the base part 10 may include the flange portion to allow the tubular part 20 to be accommodated, and when the flange portion with the open flange shape is formed in the base part 10 manufactured by the press process, there are problems in that the manufacturing cost is increased and the manufacturing process is complicated.

To solve the above problems, the upper flange 11 coupled to the upper portion of the base part 10 and the lower flange 12 coupled to the lower portion of the base part 10 are provided to form the open flange shape, and the tubular part 20 is accommodated in the open flange shape including the upper flange 11 and the lower flange 12, so that the base part 10 and the tubular part 20 may be easily coupled to each other.

The base part 10, the flange portion, and the tubular part 20 are made of a metal material and may be joined to each other by welding.

As shown in FIG. 8, all the base part 10, the flange portion, and the tubular part 20 are made of a metal material and thus have superior rigidity than a synthetic resin material such as plastic, and the base part 10 and the flange portion are separately manufactured by press molding and then coupled to each other by welding. The tubular part 20 is accommodated on the open flange including the upper flange 11 and the lower flange 12 and the tubular part 20 may be coupled to the base part 10, the upper flange 11, and the lower flange 12 by welding.

Therefore, the tubular part 20 and the base part 10 may be strongly coupled to each other.

The base part 10, the flange portion, and the tubular part 20 that are made of a metal material may be coupled to the external garnish 30 made of plastic by the mechanical coupling.

The external garnish 30 is made of a plastic material and forms the exterior of the vehicle. The plastic external garnish 30 may have various shapes so that the aesthetic impression of the vehicle may be improved.

Furthermore, the external garnish 30 is made of plastic and the base frame 100 is made of metal, so that the coupling between different materials may be rigidly performed by the mechanical coupling by bolting and riveting.

Pair of base parts 10, tubular parts 20, and external garnishes 30 are provided at transversally opposite portions of the vehicle, and a roof member 80 may be provided to be connected from each of the base parts 10 toward the roof.

The pair of the base parts 10 may be provided to be coupled to opposite side portions of the vehicle, and the roof member 80 is provided to connect the pair of the base parts 10 to each other above upper portions of the base parts 10 to support the upper portions of the base parts 10, having an effect of improving the rigidity of the body for a vehicle.

A roof panel or a sun roof may be mounted to an upper portion of the roof member 80, and the roof member 80 may support the roof panel or the sun roof.

The body for a vehicle may include a roof bracket 70 connecting the base part 10 to a roof member 80.

As shown in FIG. 1, the roof member 80 may be provided to connect the pair of base parts 10 to each other and the roof bracket 70 may be provided to connect the roof member 80 to the base part 10.

The roof bracket 70 may be variously shaped in response to the shape of the base part 10 or the roof member 80. Therefore, as the body for a vehicle is applied to vehicles with different widths, there is an effect of improving the efficiency to manufacture the various types of vehicles.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A body for a vehicle, the body comprising:
 a base part extending in a longitudinal direction of the vehicle and including a flange portion extending outward the vehicle;
 a tubular part accommodated on and coupled to the flange portion wherein the tubular part is shaped in a pipe with a closed section;
 an external garnish coupled to the base part or the tubular part to cover an external portion of the tubular part;
 a base frame including a front portion, a rear portion, and a lower portion of the vehicle body;
 an internal bracket coupled to internal portions of the base part and the tubular part to connect the base part and the tubular part to the front portion of the base frame; and
 an external bracket coupled to external portions of the base part and the tubular part to connect the base part and the tubular part to the front portion of the base frame.

2. The body of claim 1, wherein the lower portion connects the front portion to the rear portion, and
 wherein a front end portion of the base part, the tubular part, or the external garnish is connected to the front portion of the base frame and a rear end portion of the base part, the tubular part, or the external garnish is connected to the rear portion of the base frame.

3. The body of claim 1, wherein the base frame is made of a metal material.

4. The body of claim 1, wherein the internal bracket is coupled to an external portion of an internal plate of the front portion of the base frame, and the external bracket is coupled to an external portion of an external plate of the front portion of the base frame.

5. The body of claim 4, wherein a length of the internal plate of the front portion is preset longer than a length of the external plate.

6. The body of claim 1, wherein the internal bracket is coupled to an internal portion of an internal plate of the front portion of the base frame and the external bracket is coupled to an external portion of an external plate of the front portion of the base frame.

7. The body of claim 2, wherein the rear portion of the base frame includes a C pillar extending toward a roof of the vehicle and the lower portion includes a B pillar extending toward the roof, and
rear end portions of the base part and the tubular part are connected to the C pillar, and middle portions of the base part and the tubular part are connected to the B pillar.

8. The body of claim 7, further including:
a B pillar bracket connected to the tubular part to connect the tubular part to an external plate of the B pillar,
wherein the base part is connected to an internal plate of the B pillar.

9. The body of claim 8, wherein the base part is connected to an external portion of the internal plate of the B pillar and the B pillar bracket is connected to an external portion of the external plate of the B pillar.

10. The body of claim 8,
wherein the flange portion is shaped in a flange,
wherein the flange portion includes an upper flange connected to an upper portion of the base part connected to the internal plate of the B pillar and extending outward the vehicle and a lower flange connected to a lower portion of the base part and extending outward the vehicle, and
wherein the tubular part is accommodated between the upper flange and the lower flange and is coupled to the base part.

11. The body of claim 8,
wherein an end portion of the B pillar is bent inwardly from the vehicle and the internal plate of the B pillar is formed longer than the external plate of the B pillar.

12. The body of claim 7, wherein the base part is connected to an external plate of the C pillar and the external garnish is connected to a lower end portion of the external plate of the C pillar.

13. The body of claim 1,
wherein the flange portion is shaped in a flange,
wherein the flange portion includes an upper flange connected to an upper portion of the base part and extending outward the vehicle and a lower flange connected to a lower portion of the base part and extending outward the vehicle, and
wherein the tubular part is accommodated between the upper flange and the lower flange and is coupled to the base part.

14. The body of claim 1, wherein the base part, the flange portion, and the tubular part are made of a metal material, and are joined to each other by welding.

15. The body of claim 14, wherein the base part, the flange portion, and the tubular part that are made of the metal material are coupled to the external garnish by mechanical coupling, the external garnish made of plastic.

16. The body of claim 1,
wherein pair of base parts, tubular parts, and external garnishes are provided at transversally opposite portions of the vehicle, and
wherein the body for the vehicle further includes a roof member connected from each of the base parts to a roof of the vehicle.

17. The body of claim 16, further including:
a roof bracket connecting the base part to the roof member.

18. The body of claim 1, wherein opposite end portions of the base part integrally connect an A pillar to a side portion of a roof of the vehicle.

19. The body of claim 1, wherein the external garnish forms an exterior of the vehicle, and is made of a plastic material.

* * * * *